United States Patent [19]

Burns et al.

[11] 4,205,780
[45] Jun. 3, 1980

[54] DOCUMENT PROCESSING SYSTEM AND METHOD

[75] Inventors: Emmett R. Burns, Danville; Morris D. Ho, Walnut Creek, both of Calif.

[73] Assignee: Teknekron, Inc., Berkeley, Calif.

[21] Appl. No.: 921,227

[22] Filed: Jul. 3, 1978

Related U.S. Application Data

[63] Continuation-in-part of Ser. No. 779,779, Mar. 21, 1977, abandoned.

[51] Int. Cl.² .................... G06K 7/14; G06K 7/08; G06K 15/00; G06K 15/02
[52] U.S. Cl. .................... 235/454; 235/449; 235/471; 235/432
[58] Field of Search ............. 340/146.3 ED, 146.3 E, 340/152, 149 A; 354/75; 346/75; 250/569; 360/81, 33; 235/449, 450, 454, 471, 493, 494; 358/128

[56] References Cited

U.S. PATENT DOCUMENTS

| | | | |
|---|---|---|---|
| 2,787,190 | 4/1957 | McWhirter | 354/75 |
| 3,216,317 | 11/1965 | Nail | 235/471 |
| 3,271,738 | 9/1966 | Kamentsky | 340/146.3 ED |
| 3,576,972 | 5/1971 | Wood | 235/487 |
| 3,691,350 | 9/1972 | Kuhns | 235/468 |
| 3,832,682 | 8/1974 | Brok | 340/146.3 ED |
| 3,859,508 | 1/1975 | Brosow | 235/491 |
| 3,867,612 | 2/1975 | Maloof | 340/146.3 ED |
| 3,875,419 | 4/1975 | Harms, Jr. | 235/471 |
| 3,903,517 | 9/1975 | Halfner | 340/146.3 ED |
| 3,943,563 | 3/1976 | Lemelson | 235/471 |
| 3,946,205 | 3/1976 | Melugin | 235/481 |
| 4,027,142 | 5/1977 | Paup | 235/475 |
| 4,047,154 | 9/1977 | Vitols | 340/146.3 ED |

OTHER PUBLICATIONS

"Cummins 4400 Key Scan® Multimedia Data Entry System", Data Systems, Cummins-Allison Corp., 800 Waukegan Road, Glenview, Ill. 60025, Form No. 13C965-15M-7/74 (undated).
"System Specification: Cummins 4400 Key Scan® Multimedia Data Entry System," Data Systems, Cummins-Allison Corp., Form No. 13C994-1174, copyrighted 1974.
"4400 Key Scan® System Conquers Rejects," Cummins Bank & Trust Co., P.O. Box 66377, Chicago, Ill., Form No. 13C993/1074.
"Scan Edit System 300, 600, and 3500," Scan-Optics, Inc., Twenty Two Prestige Park, East Hartford, Conn. 06108 (undated).
Merritt & Sargent–*Film Rejects Handling*, IBM Tech. Disc. Bull., vol. 13, No. 10, pp. 3173-3174 (Mar. 1971).

*Primary Examiner*—D. W. Cook
*Attorney, Agent, or Firm*—Flehr, Hohbach, Test, et al.

[57] ABSTRACT

A document processing system including a video camera and raster scan television monitors. The apparatus comprises a document transport that sequentially passes documents by both a machine readable data reader and a video camera. The data reader reads and stores in a digital memory the machine readable data encoded on the documents. The video camera captures the entire image of each document and stores the images in a video memory. In one embodiment the images are stored as analog signals and in another embodiment as digital signals. The system further includes a plurality of video terminals at which the operators of the system can recall and display on command both the machine readable data and the video images of the documents.

60 Claims, 10 Drawing Figures

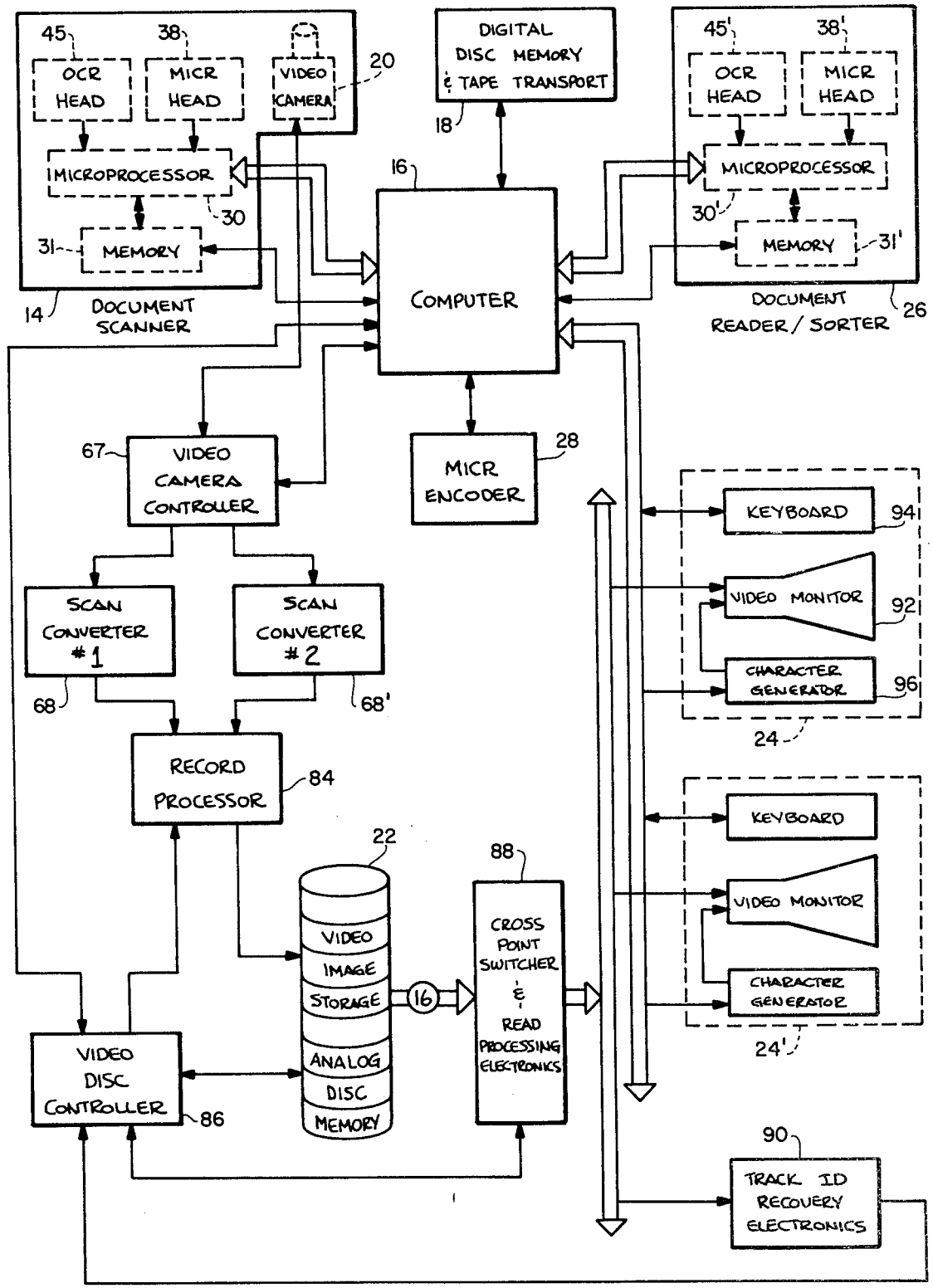
FIG_1

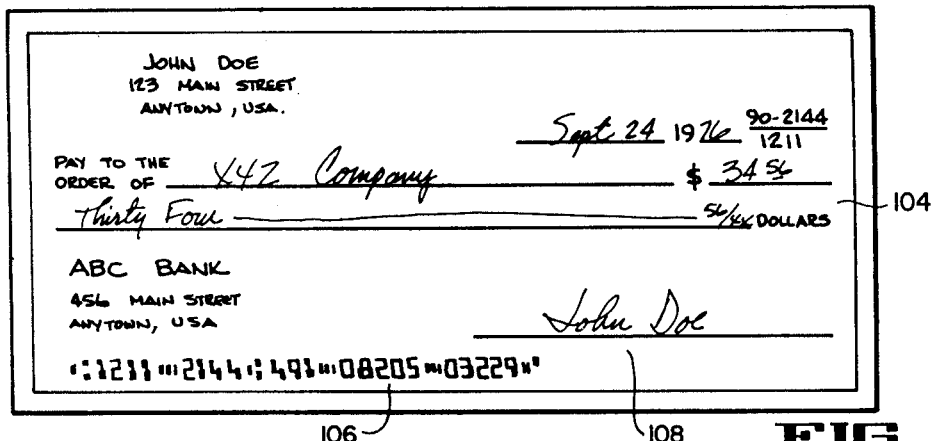
FIG_2
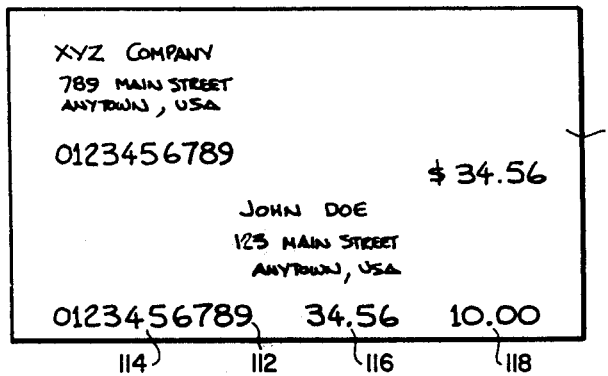
FIG_3
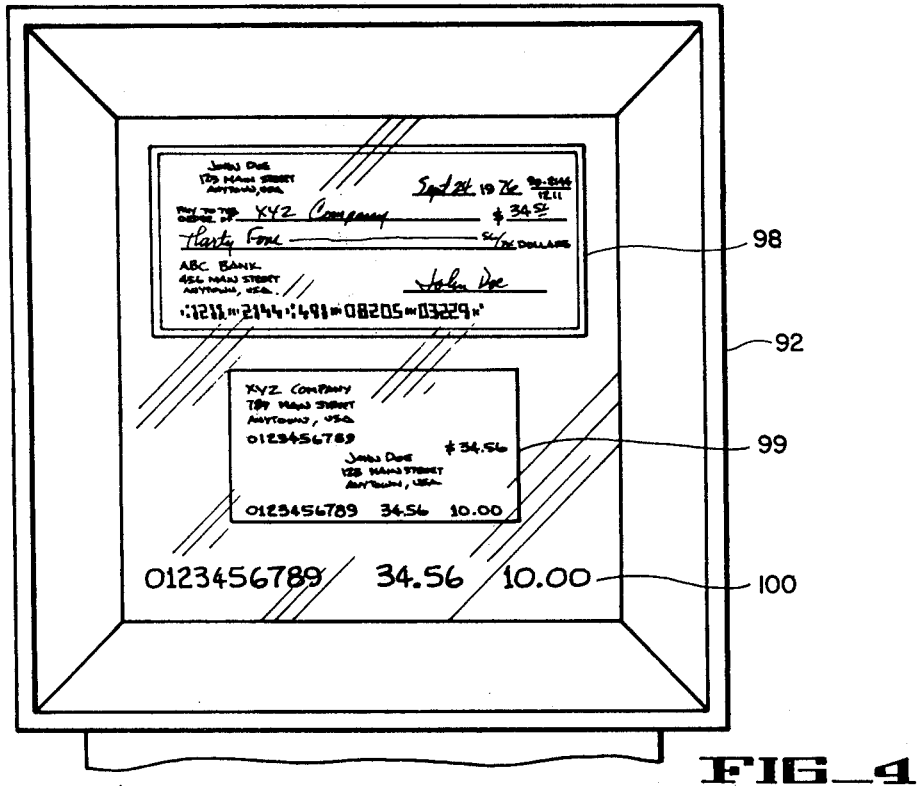
FIG_4

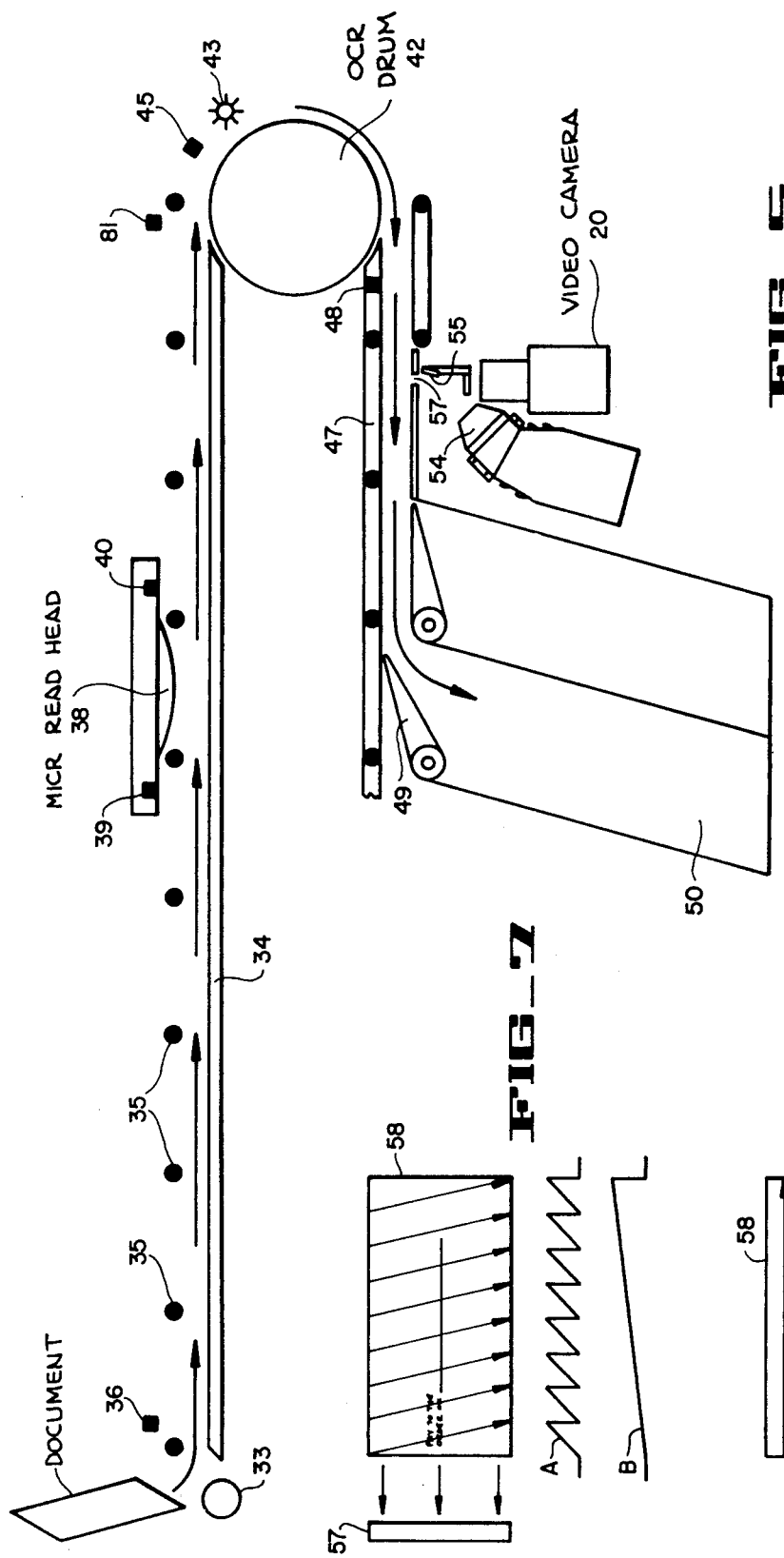
FIG_5
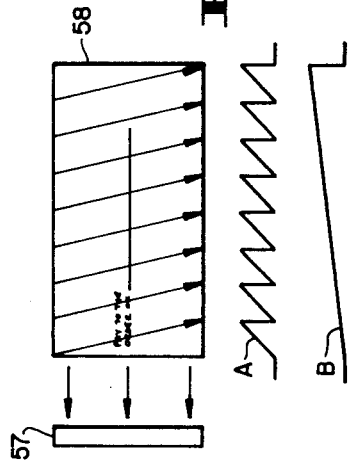
FIG_7
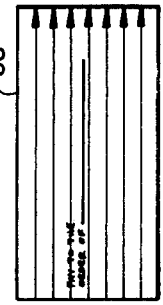
FIG_8

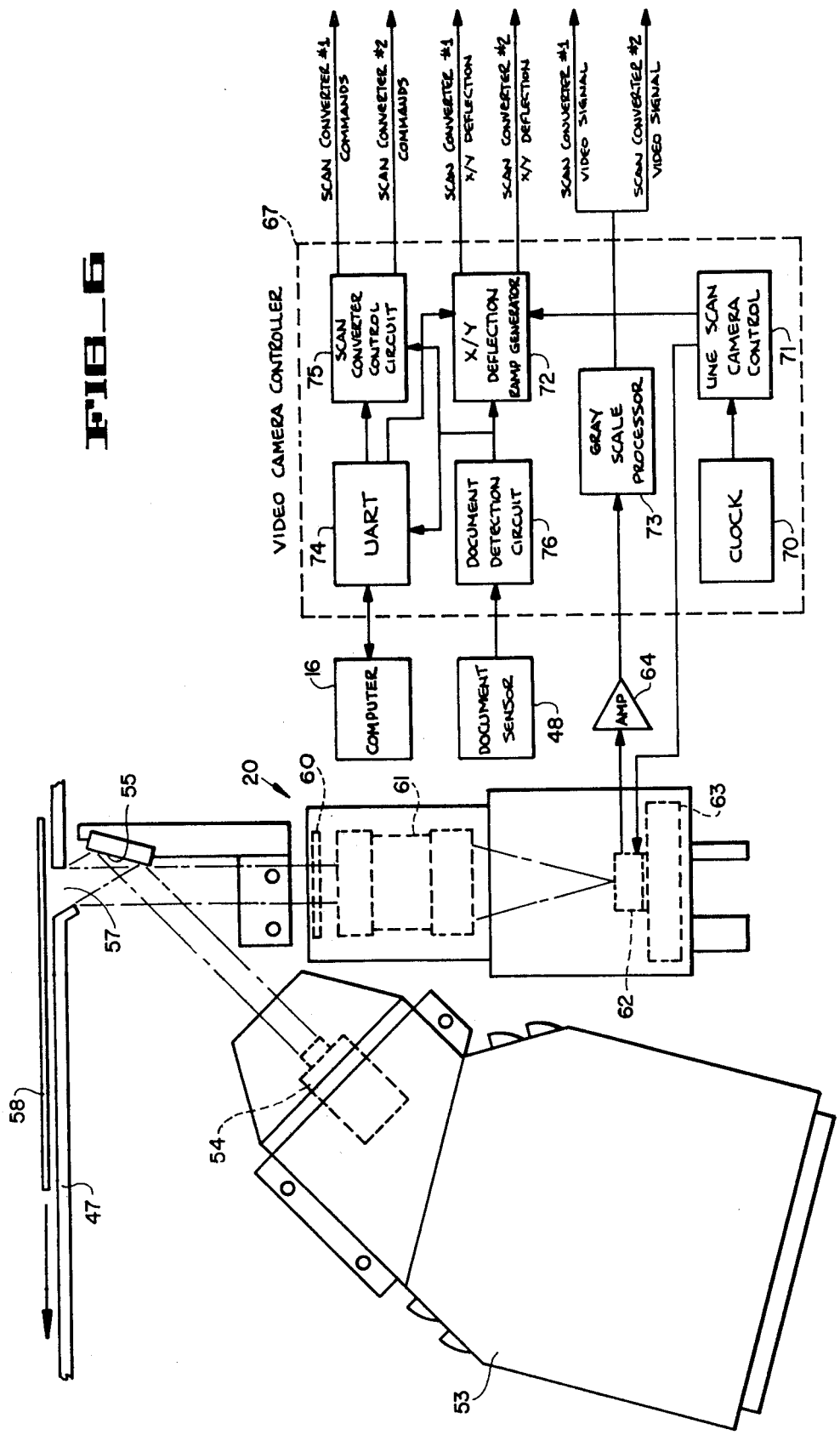

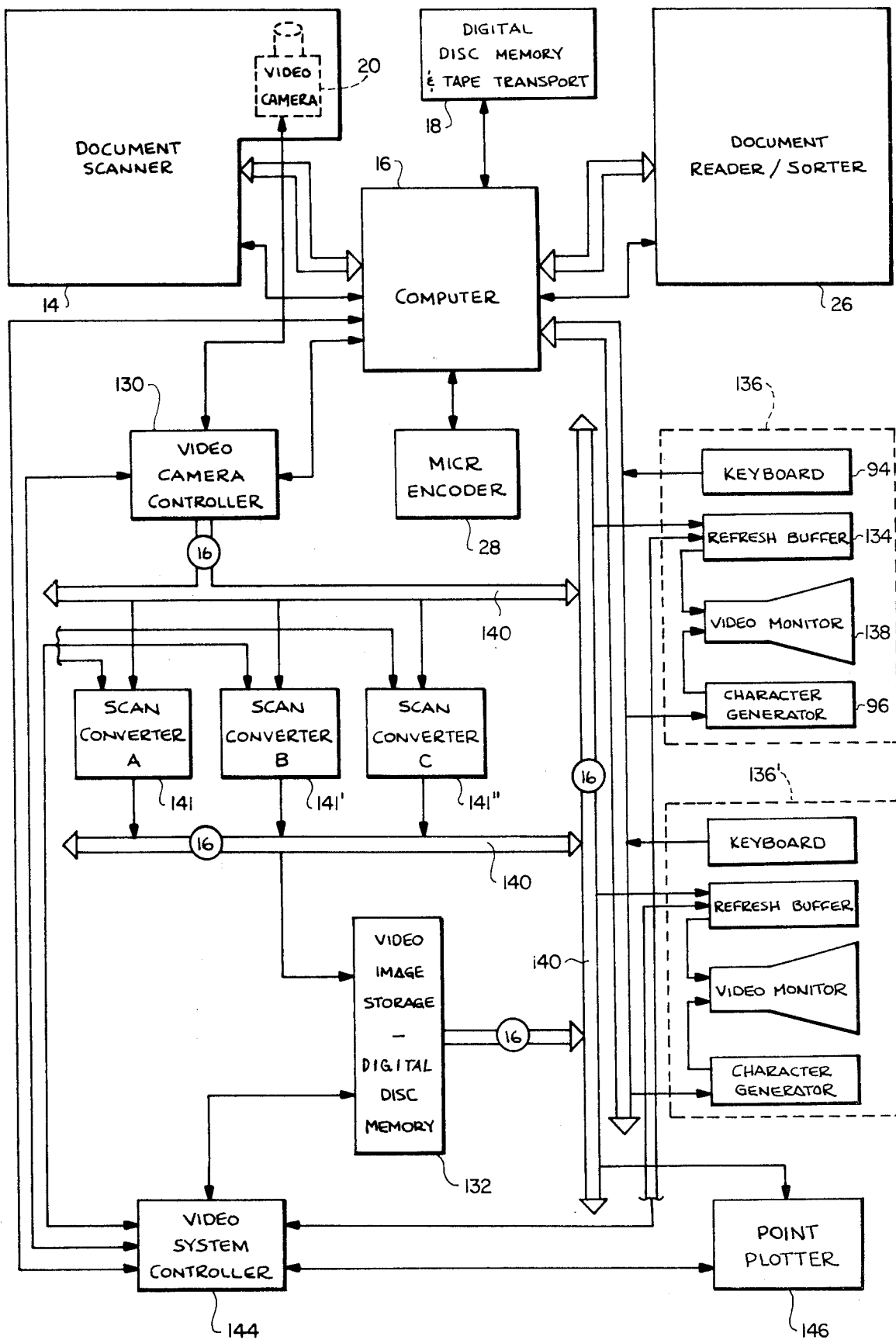
FIG_9

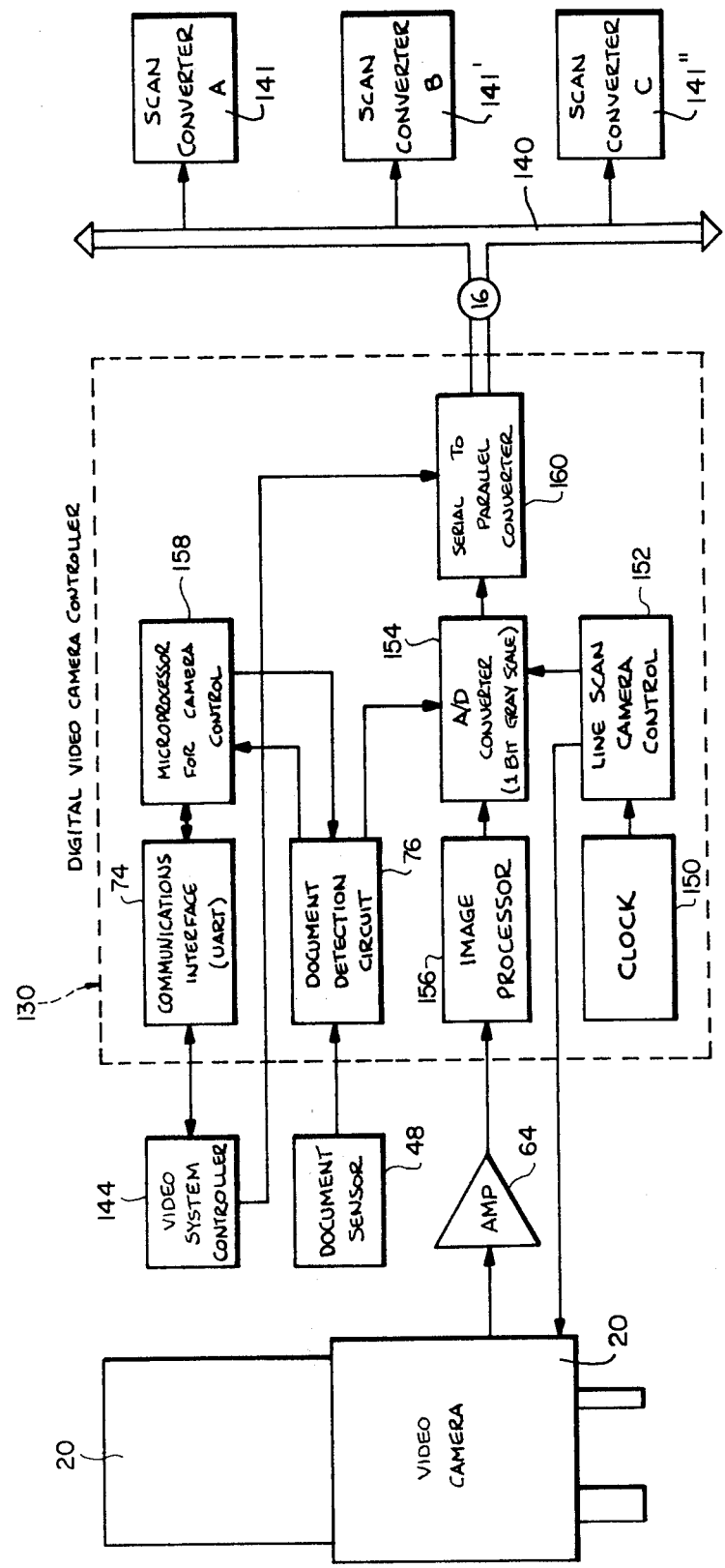

DOCUMENT PROCESSING SYSTEM AND METHOD

CROSS REFERENCE TO RELATED APPLICATIONS

This application is a continuation-in-part of an earlier filed co-pending application entitled "AN IMPROVED DOCUMENT PROCESSING SYSTEM AND METHOD" by EMMETT R. BURNS and MORRIS HO, Ser. No. 779,779, filed Mar. 21, 1977 now abandoned.

BACKGROUND OF THE INVENTION

1. Field of the Invention

This invention generally relates to machines for processing documents and, more particularly, to document processing systems that include video cameras.

2. Description of the Prior Art

In recent years more and more corporations and institutions have commenced processing documents using a high speed document transport. Such document transports are used, for example, by banks in check processing operations to process checks, in remittance operations to process checks and/or coupons, and in credit card operations to process merchant drafts. In addition, insurance companies, retailers, and public utilities use these machines to process payments, premiums, and bills.

A typical document transport has the capability of reading the machine readable data encoded on the documents being processed, recording this data, and sorting the documents in a predetermined manner according to the data. The machine readable data is digitized and recognized by the transport and stored in either a digital memory or on magnetic tape.

Recently, document transports have been constructed that incorporate a visual display for presenting a picture of the machine readable data read from the documents. These displays are typically point plotting, cathode ray tubes that read out the digitized data stored in the memory of the transport. These point plotting systems are used, for example, when the document transport cannot recognize the machine readable data on a document. Typically the digital field read from the document is displayed to the operator and the scanned documents physically delivered to the terminals so that a visual inspection of the unrecognizable data can be made. The operator then manually enters the correct data through a separate key-entry module.

One problem with these prior visual display document processing machines has been the limitation of the amount of information that can be stored in the digital memory. Typically these machines can process over 500 documents per minute and at these speeds only a few lines, called scan lines, are read from each document. A typical digital memory in such a machine does not have sufficient storage capacity to contain the entire image of each document.

A second limitation has been the requirement to physically handle and deliver to terminals each document in order to enter non-machine readable data as well as rejected characters on the scan line.

Another related problem has been the continuing lack of sensitivity and the long exposure times required by a conventional vidicon camera. Typically, a vidicon camera has an exposure time of about 1/30th of a second per line and long image retention. If such cameras are used in document processing systems to capture the images of the documents, the speed of the transport must be reduced in order to accommodate the physical limitations of the camera.

The present invention has application in any document processing operation where it is desirable to capture and display the images of the documents being processed. It has been most recently adapted for remittance processing in commercial banks and is described in the specification in that context. It should be understood, however, that this description is merely one particular application of the invention and is not intended in any way to limit the scope of the invention.

The remittance processing services provided by commercial banks to their clients include the processing and deposit of payments made to their clients by customers for goods and services. The bank processes these payments and deposits the money into the client's account as of the date of receipt. The client's cash flow is increased because the funds are available from the date of receipt at the bank. This service is called "LOCK-BOX" because the payments are sent directly to a post office box controlled by the bank.

The remittance accounts serviced by the bank generally fall into two categories. In one category are the high volume, retail accounts involving machine readable remittance documents and comparatively small amounts of money. These accounts include payments made to oil companies, public utilities, and in bank credit card transactions. The other category is the low volume, wholesale accounts involving large payments and remittance documents that are not usually machine readable. In this category the remittance documents are commonly bills of lading, invoices, and shipping documents.

FIG. 2 illustrates a typical check 104 drawn by a remitter and sent to the bank's lock box in payment of a previously received statement. It should be noted that along the lower margin of the check is a horizontal line 106 of MICR data. MICR is the acronym for Magnetic Ink Character Recognition data. The data in the MICR line indicates, inter alia, the account number of the remitter. The amount of the check is subsequently encoded by the bank in MICR in the space 108 below the remitter's signature line.

FIG. 3 depicts the general format of a remittance document 110 that accompanies the checks to the bank's lock box. These documents can take almost any form and are familiar to anyone who pays for goods and services by mail. In the upper left hand corner of the document of FIG. 3 is the name of the company and below that is the account number of the remitter. The remitter's address is centrally located on the document. Along the lower horizontal margin of the document is a machine readable line 112 of OCR data. OCR is the acronym for Optical Character Recognition data. This line of data includes the account number of the remitter 114 and the amount due.

In the manual mode of remittance processing the bank employee first opens the envelope mailed from the remitter and received in the bank's lock box. In this envelope is a check such as illustrated in FIG. 2 and a remittance document such as FIG. 3. Although procedures vary, the employee usually first scans the check to verify that the check is negotiable and that the check is made out to the proper payee. The employees of the bank next separate the checks and remittance documents into piles depending on the amount paid. These piles include the checks and remittance documents making full payment, minimum payment, partial payment, and other miscellaneous categories.

When the full payment pile reaches sufficient size, the remittance documents are run through a document transporter that reads the OCR line on each document. The transporter prints out a listing of each account number and full pay amount as well as the sum of the entire batch.

The checks in the full pay pile are next manually encoded with the amount of the check on proof machines. The operator of the proof machine reads the amount of each check, enters it on the keyboard of the proof machine, and inserts the check into the machine. The proof machine automatically prints the amount of the check in MICR below the signature line of the check. In FIG. 2 the amount is encoded at location 108. While the checks in the pile are being encoded, the proof machine prints out a listing of the data encoded on the checks.

Next the totals obtained from the OCR transporter and the proof machine are compared. If the totals agree, the checks and remittance documents are passed into another department of the bank. If the totals do not agree, the bank employee must compare the two listings line by line in order to find the discrepancy.

The documents and checks in the minimum pay pile are processed and reconciled in essentially the same manner. However, the OCR scanner in the transporter reads the minimum pay amount 118 on the remittance documents and not the full pay amount 116, FIG. 3. The checks are processed in exactly the same manner as described above.

For the transactions making a partial payment, the remittance document initially does not contain the amount of the payment in machine readable form. In some cases, the bank employee can write the amount of the payment on the face of the remittance document in a machine readable format. The numbers must be carefully written in a specific style and often an OCR scanner misreads them. In other situations, the account number on the remittance document is read by the OCR scanner and the bank employee inserts the amount of the check into a computer terminal. A computer is used to correlate and print out the payments and account numbers.

When the documents having no machine readable data are processed, the bank employee manually inserts the account numbers and payments listed on the documents into a computer terminal. The computer prints out a listing of all the entries and the total of the payments. The checks are processed as described above. The total of the payments listed on the documents is then compared with the listing of the checks obtained from the proof encoder.

From the foregoing description it should be appreciated that one of the main problems in remittance processing is the fact that the entire procedure is labor intensive. Most of the above steps must be manually performed by the employees of the bank. For example, the initial sorting is manually done. Reconciliation of the remittance document total with the check total is done line by line through both listings. Also, each check is first scanned by an employee to determine if it is negotiable and then later to encode the amount in MICR.

It should also be noted that the documents are transferred from station to station throughout the bank's operations center and locating documents during this processing procedure is often difficult. Further, because the documents go from station to station, there is always the possibility that some of the documents may be lost or misplaced.

From a management viewpoint there is never a simple, easy quantitative capture of information. The employees of the bank are required to maintain extensive logs so that the management of the bank can determine what has occurred. There is also a general lack of data available on a management level concerning the amount and flow of work on a day-to-day basis. Thus, it is very hard for the management of a bank to control the cost of its remittance processing.

Additionally, each bank extends the line of credit to its clients based on the funds received in the lock box as of the date of receipt. If the bank cannot completely process all of the documents received in one day, then it must hold over the work. These undeposited, held-over checks represent a significant loss to the bank's operation.

SUMMARY OF THE INVENTION

The present invention is directed to a method and apparatus for processing documents. The documents are encoded with both machine readable and human readable data and the apparatus reads and stores the machine readable data. The image of the document is captured by a video camera having an output signal which is stored in a video memory for subsequent use.

The present invention also includes a high-speed, line scan, video camera system for capturing the images of the fast-moving documents as well as a plurality of video terminals at which the operators of the system can display the images of the objects as well as the machine readable data obtained therein.

It is the object of the present invention to provide a novel method and apparatus that overcomes the limitations and disadvantages of the prior art.

Another object of the present invention is to combine a video camera system with a document transport that reads machine readable data so that a picture of each document and the machine readable data encoded thereon can be obtained.

A further object of the present invention is to reduce the amount of manual labor required in document processing.

An additional object of the present invention is to speed up the process of document processing so that a higher volume of transactions can be processed and the number of daily holdover documents minimized.

Still a further object of the present invention is to reduce the number of errors which were heretofore considered to be inherent in a document processing operation.

Also an object of the present invention is to develop a video camera that operates hundreds of times faster than a standard vidicon TV camera and exhibits none of the image retention effects common to such cameras.

Additional objects and features of the invention will appear from the following description in which the preferred embodiments have been set forth in detail in conjunction with the accompanying drawings.

BRIEF DESCRIPTION OF THE DRAWINGS

FIG. 1 is a schematic diagram of an apparatus for processing documents according to the present invention.

FIG. 2 is an illustration of a typical bank check illustrating the scan line of MICR data along the bottom margin.

FIG. 3 is an illustration of a typical remittance document having a scan line of OCR data along the bottom margin.

FIG. 4 is an illustration of the video terminal display of the bank check of FIG. 2, the remittance document of FIG. 3, and the OCR data line read from the remittance document.

FIG. 5 is a diagrammatic, side elevational view of a document transporter according to the present invention.

FIG. 6 is a diagrammatic, side elevational view of the video camera of FIG. 5 and a schematic diagram of the video camera controller of FIG. 1.

FIG. 7 is a schematic diagram illustrating the lateral scan of a check passing in front of the video camera of FIG. 5.

FIG. 8 is a schematic diagram of the raster scan of the check of FIG. 7 as displayed on the video terminal of FIG. 4.

FIG. 9 is a schematic diagram of an alternative embodiment of an apparatus for processing documents according to the present invention.

FIG. 10 is a schematic diagram of the video camera controller of FIG. 9.

DESCRIPTION OF THE PREFERRED EMBODIMENTS

The present invention contemplates the incorporation of a video camera into an apparatus for processing documents. This invention has most recently been adopted for use in the field of remittance processing and is described below in that specific context. It should be understood, however, that the present invention has wide application outside of the field of remittance processing, and the scope of the present invention should be measured only by the allowed claims.

General Description

One embodiment of the present invention is schematically illustrated in FIG. 1 as it is incorporated into a remittance processing system. The system includes a document scanner 14 that sequentially transports the documents by an OCR read head and an MICR read head. These heads record the machine readable information from the documents. This machine readable data is digitized, recognized, passed through a computer 16 and stored in a digital memory 18. The system also includes a video camera 20 mounted on the document scanner and positioned to capture the video image of each document. The video camera has an analog signal and the video image data is stored as an analog signal in a video disc memory 22. The operators of the system can commandably call up either the machine readable information or the stored video image of the documents while seated at the video terminals 24. After reviewing the document images and the data read by the read heads, the operators can enter new data or update old data via the terminals. The documents can also be subsequently sorted by the document reader/sorter 26. The system also includes a MICR encoder 28 that prints the dollar amount on each check processed through the system.

An alternative embodiment is schematically illustrated in FIG. 9. The system operates generally in the same manner as described above except the video image of each document is digitized in the video camera controller 130 and stored in digital form in the digital disc memory 132. In addition, the video images are transferred in digital form to a refresh buffer 134 in each terminal and displayed on a video monitor 138.

It should be noted that the term document as used herein includes both bank checks and remittance documents, and when a specific type of document is described, it is specified with more particularity.

Document Transport

The document scanner 14, FIG. 1, includes a suitable document transport and a video camera 20. In the preferred embodiment the document transport can be any commercially available system and in the embodiment actually constructed the transport was a Cummins-Allison Model 4216 Scanner. This transport is available from the Cummins-Allison Corporation of Glenview, Ill. The transport moves documents at a nominal rate of 100 inches per second. and for documents having a nominal length of six inches, the transporter moves approximately thirty-six thousand documents per hour with a two-inch gap between each document. The transport of the preferred embodiment has a variable thickness document feeder so that remittance documents, checks and miscellaneous coupons can be passed through the various data read heads. The transport is controlled by an independently programmable microprocessor 30. The program for the micro-processor and the machine readable digitized data read by the various read heads are stored in the memory 31 of the document scanner.

The document reader/sorter 26, FIG. 1, is a duplicate of the document scanner 14 as described above. For the sake of brevity it will not be described in detail. The purpose of the duplication is to provide back-up capability for the system. In the embodiment actually constructed the reader/sorter contained in video camera that was operable but not connected.

Before the documents are loaded into the document scanner 14, FIG. 1, the documents are sorted by the employees of the bank so that the documents for each transaction are together. Typically, a transaction includes both a check and a remittance document. All transactions are loaded into the document feeder in the same sequence. As described above, the checks 104, FIG. 2, have an MICR line of data 106 along the bottom margin and the remittance documents 110, FIG. 3, have an OCR scan line located somewhere on the document. In FIG. 3, the OCR scan line includes the figures identified by reference numerals 112, 114, 116, and 118.

FIG. 5 is a diagrammatic view of the transporter in the document scanner 14, FIG. 1. Each document is pulled into the document transport by a feed roller 33. The document passes along the upper transport 34 and is aligned therein by a plurality of alignment rollers 35. The spacing between each document is controlled by a document sensor 36. The sensor is a photocell that can stop the feeder and establish the gap length between each document. In the preferred embodiment the documents have a nominal gap length of two inches.

The documents pass one by one down the upper transport 34, FIG. 5, in a continuous stream without stopping. Each document first passes under an MICR read head 38 that includes both a leading edge detector 39 and a trailing edge detector 40. The leading edge detector senses that a document is about to pass under the MICR head and triggers a MICR pattern recognition circuit (not shown) in the document scanner. The motion of the document out from under the MICR read head is sensed by the trailing edge detector. The data captured by the MICR read head 38 is passed to the micro-processor 30, FIG. 1. If the micro-processor determines that the MICR read head captured MICR data from the document just passed, the data is stored in the memory 31 of the document scanner.

After passing beneath the MICR read head 38, FIG. 5, each document passes over an OCR drum 42. The OCR drum includes a light source 43 and a reflective OCR read head 45. The OCR read head scans a selected line along the document being transported. The data digitized by the OCR read head is then processed via pattern recognition circuits. If the document contains OCR data, this data is stored in the memory 31 of the document scanner 14, FIG. 1.

After passing by the OCR drum 42, FIG. 5, the documents run along the lower transport 47. Immediately after the OCR drum 42 the documents pass in front of a document sensor 48 that triggers the video camera 20. The operation of the document sensor 48 and the video camera 20 is further described below. Thereafter, the documents travel along the lower transport until the micro-processor 30, FIG. 1, opens a preselected pocket gate 49 and the documents pass into one of the pocket 50. The sequence of the documents is maintained, and when one of the pockets is filled, the micro-processor commences to fill the next pocket in line.

When the microprocessor 30, FIG. 1, has received both scan lines of OCR and MICR data read from the two documents in a transaction and stored these data in its memory 31, the microprocessor notifies the computer 16 that a transaction has been captured. The computer thereafter reads both the OCR and MICR data and stores this data in its digital memory 18, FIG. 1, as described below.

The Computer, Disc Memory, and Tape Transport

The document processing system of the present invention utilizes a computer 16, FIG. 1, to coordinate the various components of the system. In the embodiment actually constructed in Eclipse S200 computer available from Data General of Southboro, Mass., was used. The computer contained 192 kilobytes of 800 nanosecond core memory. The hardware architecture included a stack of sixteen hardware priority interrupt levels. To allow a reduction in cycle time, the memory was interleaved and overlapped. Instructions were sixteen bits long and there were four hardware registers, two of which were used for indexing. The computer also had an additional sixteen memory index registers and a high speed, direct memory access channel.

The Eclipse S200 was equipped with Data General's Real Time Disc Operation System (RDOS), model Nos. 3476M and 3473M, revision 5 and Fortran 4 with hardware floating point support.

Connected to the computer 16, FIG. 1, are two digital disc memory units 18. In the preferred embodiment each disc has ten megabytes of memory. In the embodiment actually constructed the digital disc memory units were obtained from Data General and supported under the RDOS operating system. Each unit had an average access time of 50.5 milliseconds and a transfer rate of 312 kilobytes per second. The digital disc memory is used to store the program used by the computer as well as the machine readable data obtained from the documents by the OCR and MICR leads. The digital memory is also used to store the address of the video image of each document.

Two magnetic tape transports 18 are also connected to the computer 16, FIG. 1. One transport uses nine track 800 byte per inch magnetic tape running at seventy-five inches per second and the other transport uses nine track 1600 byte per inch magnetic tape. In the embodiment actually constructed these tape transports were also purchased from Data General. The tape transports are used to record selected accounting data from the OCR and MICR data stored in the digital disc memory. The accounting data is specified by the bank's client for whom the remittance processing is performed. The requested accounting data is put on a magnetic tape and thereafter transferred to the client for its own accounting.

MICR Encoder

A MICR encoder 28, FIG. 1, is connected to the computer 16 for encoding the dollar amount on each check at location 108, FIG. 2. The encoder is a document transport through which only checks are processed. In the embodiment actually constructed a Document Encoder S1515-513 from the Burroughs Corporation of Detroit, Mich., was used.

During the document processing operation, as described below, the operators at the video terminals 24 read the dollar amount of each check from the video image and enter this amount into the digital disc memory 18 via the keyboards 94. After all of the documents have been processed at the video terminals 24 and sorted by the reader/sorter 26, the checks are run through the MICR encoder 28. The checks are automatically feed into the encoder under the control of the computer 16.

In the encoder, the checks first go through a MICR read station where the MICR line 106, FIG. 2, on check is again read. This step is to verify which check is being printed. Then the dollar amount is obtained by the computer from the digital disc memory 18 and is transferred to the MICR transport. The computer thereafter commands the MICR transport to encode a given check with a given dollar amount. After encoding the check is transported to a pocket similar to those illustrated in FIG. 5. The encoder also prints a master add tape containing all of the dollar amounts that it encodes. The add tape serves the purpose of an audit trail.

The Video Camera

FIG. 6 illustrates a diagrammatic view of the video camera 20. The video camera includes a housing 53 and an illumination source 54. The illumination source is a frosted, tungsten filament light bulb powered by a DC power supply and generating 500 watts of lamp power. The lamp illuminates a cylindrical lens (not shown) that directs the light onto a front surface mirror 55. The mirror projects a narrow rectangle of light through an elongate lateral slot 57 located in the lower transport 47 of the document scanner, FIG. 5. As illustrated in FIGS. 6 and 7, the slot 57 in the lower transport 47 has a narrow dimension in the direction of motion of the document 58 and a longer dimension lateral to the direction of motion. In FIG. 6 the longer dimension is orthogonal to the plane of the drawing.

The light from the mirror 55 is reflected off of the document of 58 and down through a high pass infrared filter 60. The purpose of the filter is to correct the sensitivity of the optical detector by reducing the red components in the reflected light. The reflected beam has an elongate cross section of dimensions comparable to the slot 57. The light thereafter passes through a lens 61 that brings the reflected light to a line focus on the optical detector 62. The lens is a twenty-five mm. F2.5 camera lens of the type commonly used on thirty-five mm. single lens reflect cameras.

The optical detector 62 is a solid state, line scanner of known construction adjustably mounted on the document scanner 14 by an adjustable mount 63. The scanner is a high density, monolithic, linear array of silicon detectors. The array consists of a row of 512 silicon diodes each of which is sensitive to the intensity of the light reflected by the document 58. The reflected light is brought to a line focus on this row of photo diodes. Associated with each photo diode is an individual parallel storage capacitor on which the photo current is integrated. Each storage capacitor is connected through MOS transitor switch to a common video output line. The switches are turned on and off in sequence by an integrated shift register scanning circuit. The photo sensitive area of the solid state line scanner is 1 mils wide and 1.024 inches long. In the embodiment actually constructed, the illumination source 54 and the solid state line scanner 62 were obtained from the Reticon Corporation of Sunnyvale, Calif.

In operation, the document 58 is moved across the slot 57 from right to left as illustrated in FIG. 6. FIG. 7 further illustrates the motion of the document across the slot. The optical line scanner 62 consists of a single row of photo diodes each of which linearly responds to the light reflected from the document. Each photo diode produces an electrical signal proportional to the intensity of the incident light. The line scanner scans in one dimension along the longer dimension of the slot 57 and in a direction lateral to the direction of motion of the document 58. The net result of the combined motion of the document across the slot and the lateral scan of the line scanner is the two dimensional scan of the document illustrated in FIG. 7. It should be noted that each photo diode in the line scanner is responsive to the light incident between the scanner sampling times so there are no dead zones in the image of the document.

The output of the line scanner 62 is amplified by an amplifier 64 which is connected to the video camera controller 67 described below. The actual output signal from the line scanner is a series of pulses corresponding to each photo diode sample. The area of each pulse is proportional to the intensity of the illumination falling on the photo diode. The line scanner is sampled from one end to the other and always in the same direction by an integrated shift register (not shown). In FIG. 7 this sampling of the photo diode array is from top to bottom.

Video Camera Controller (FIG. 6)

Referring to FIG. 1, the video data from each line scan across the document is passed from the video camera 20, FIG. 1, to one of two scan converters 68, 68'. The scan converters and the video camera are all controlled by a video camera controller 67.

Referring to FIG. 6, the video camera controller 67 includes a clock 70 that generates a 6.5 megahertz output. The output from the clock is passed to a line scan camera control 71. The camera control is connected to the optical line scanner 62 and provides the clocking pulse for the integrated shift register (not shown) described above. The clocking rate of the line scanner is the rate at which the photo diodes are sequentially sampled. The line scan camera control 71 also provides to the line scanner a start pulse and the power to operate. The line scan camera control 71 is also connected to the X/Y deflection ramp generator 72 in order to provide an end of scan pulse corresponding to wave form A, FIG. 7.

The video output signal from the line scanner 62 passed through an amplifier 64 and a gray scale processor 73. The gray scale processor is of known construction and is used to boost the gray level video signals up to white. The purpose of the gray scale processor is to generate high contrast images by making all of the writing on the documents captured by the video camera to appear black. This circuit thus makes the bank checks more easily readable on the video terminals. The video signals from the gray scale processor 73 are passed in parallel to the two scan converters 68.

The video camera controller 67, FIG. 6, is controlled by commands received from the computer 16 through an universal (bi-directional) asynchronous receiver/transmitter (UART) 74 of known construction. The decoded commands from the computer are passed by the UART to the scan converter control circuit 75. The scan converter control circuit transmits write, unblank, and erase commands to the selected scan converter. The UART is also connected to the X/Y deflection ramp generator to transmit a ramp signal to the selected scan converter. The deflection ramp generator 72 is of known construction and generates deflection ramp signals for the scan converters.

The video camera controller 67 is synchronized to the passage of each document through the document scanner 14. Referring to FIG. 5, the document transport described above is located on the lower document transport 47 at a position to indicate the presence of a document after leaving the OCR head. The document sensor indicates both the leading and trailing edges of the document. The output of document sensor 48 is passed to a document detection circuit 76, FIG. 6, that indicates the arrival of a document to the computer 16 through the UART 74. The document detection circuit also provides trigger pulses to the X/Y deflection ramp generator 72 and the scan converter control circuit 75.

The Scan Converters

Referring to FIG. 1, the scan converters 68, 68' receive the video images of each document taken by the video camera 20 via the video camera controller 67. Each scan converter acts as an intermediate, analog memory storage device. The scan converters are used to form a composite image of both the bank check and the remittance document. As described above, the bank check and remittance document are transported through the document scanner 14, FIG. 1, one after the other in a predetermined sequence. The scan converter combines the video signals from each document together so that the check is displayed above the remittance document as illustrated in FIG. 4.

The scan converters also convert the lateral scan of each document into a format that can be displayed on a conventional television monitor. FIG. 7 illustrates the lateral scan of the video camera 20 as the document 58 passes across the slot 57. The video camera sweeps across the width of the check and the motion of the document causes the horizontal displacement. The scan converters translate this analog video signal into a standard 525 line analog video signal suitable for display on a standard television set. FIG. 8 illustrates the raster scan of this television signal as it portrays the image of the document 58.

In the embodiment actually constructed, each scan converter 68, FIG. 1, was a Model 639, Scan Conversion Memory, manufactured by Hughes Aircraft Company, Industrial Products Division, Carlsbad, Calif.

Operation of the Video Camera, Video Camera Controller, and Scan Converters

When the first document passes out from under the MICR read head 38, FIG. 5, the leading edge of the document next passes under a document sensor 81, FIG. 5. This document sensor notifies the computer 16 that a document is coming. If the video camera system has been initialized, the computer sends a system ready command to the UART 74, FIG. 6. If the system ready command was received by the UART, the leading edge of the document passing under the document sensor 48, FIG. 5, causes the video camera 20 to commence capturing the image of the document. The video camera 20 scans across the slot 57 from top to bottom as illustrated in FIG. 7. The combined motion of document 58 across the slot and the line scan of the video camera generates the scan illustrated in FIG. 7.

The analog output of the video camera 20, FIG. 6, is passed through the gray scale processor 73 and is sent in parallel to both scan converters 68, 68'. The write command and the unblanking signal are sent by the scan converter control circuit 75 to the appropriate scan converter selected by the computer 16. The X/Y deflection generator in a similar manner sends an X/Y deflection ramp signal to the selected scan converter. When the trailing edge of the document passes beneath the slot 57, FIG. 5, the document detection circuit 76, FIG. 6, notifies the computer 16 and triggers the video camera controller to stop capturing the image. The image of the first document is thus stored in one-half of the scan converter.

After the gap between the documents is passed, the leading edge of the next following document triggers document sensor 48, FIG. 5, to again commence capturing a video image. The process of video image capture described above is repeated again and the second document image is stored in the lower half of the selected scan converter. Because the documents are presorted in a predetermined alternating sequence, both the bank check and the remittance document are stored together as one composite video image in the scan converter.

After the second document has passed from beneath slot 57, the computer is notified that the image of one complete transaction has been captured. Next, the computer commands the video camera controller 67 to shift over to the other scan converter. The newly selected scan converter thereafter receives the video image data from the video camera 20 in the manner described above. The previously selected scan converter which presently contains the composite video image of the first two documents is now connected to the video disc memory 22 in the manner described below. The composite video image is now passed to the video disc memory. Thus, while one scan converter is receiving video image data from the video camera 20, the other scan converter is writing the previously received data into the video disc memory 22, FIG. 1. This process continues until the images of the second set of documents are captured and the computer switches the scan converters back to the first described arrangement. The scan converters are thereby shifted back and forth in an alternating manner throughout the processing run.

Storage of the Video Image

The outputs of the scan converters 68, 68', FIG. 1, are passed to a record processor 84. The record processor takes its video input from the selected scan converter and multiplexes it with a track identification signal (ID) from the video disc controller 86, FIG. 1. The record processor also puts this combined signal into a format suitable for recording on magnetic media. The output of the scan converter is a standard 525 line, 60 field per second, video signal. The record processor switches back and forth between the scan converters on command from the computer 16. This switching between scan converters occurs because of the time constraint encountered in gathering video images at high speed. The track identification input from the video disc controller 86 is an NRZ data stream that is multiplexed onto the video signal with a separate subcarrier.

The multiplexed analog video signal from the record processor 84, FIG. 1, is transmitted to a video image storage medium 22. In the preferred embodiment this storage medium is a suitable disc memory of known construction comprising eight video discs each having two heads. Each disc can record the analog signals corresponding to 300 complete transactions. The disc memory serves both as a storage medium and as a time delay for the system. In addition, the disc memory acts as a refresh buffer so that each frame can be kept in view on the terminal monitor.

The video disc memory 22, FIG. 1, is controlled by the video disc controller 86. The disc controller steps the heads from track to track on each disc and commands both the writing and erasing of the tracks. In addition, the video controller raises and lowers the heads and generates the track identifying information for the record processor 84 described above. The video disc controller is commanded by the computer 16 so that each transaction can be recorded on the disc memory and recalled under the command of the operator.

The output of the video image storage medium 22 is connected to a cross point switcher 88. The cross point switcher connects the video terminals 24 to any selected disc. The cross point switcher takes sixteen inputs from the sixteen read head in the disc memory and forms a switching matrix having nine outputs. In the preferred embodiment eight video terminals 24 are used and one output is connected to the track ID recovery circuit 90 described below. A commandable switch is located at each cross point between the inputs and outputs of the cross point switcher. These switches can be opened and closed by the video disc controller 86, FIG. 1. In addition, within the cross point switcher are read processing circuits of known construction for demodulating the video signals from the disc memory into standard television format usable by the video monitors.

The cross point switcher 88 is also connected to a track ID recovery circuit 90, FIG. 1. This circuit verifies that the recording heads and the disc memory 22 have been stepped by the video disc controller 86 to the proper position. Whenever a track in the disc memory is addressed, the write head (not shown) is directed to move to that track by the video disc controller. Once the head is in position, one revolution of the disc is used to read the information previously recorded on that track. For this one revolution the cross point switcher 88 connects to the track ID recovery circuit. The video signal recorded on the track is ignored and the track identification data previously recorded on the track is used. This information is converted to a binary wave train by the track ID recovery circuit and is compared with the track identification signal ordered by the video disc controller. If the two signals correspond, the write head has been stepped to the proper track by the video disc controller.

If the output of the track ID recovery circuit 90, FIG. 1, corresponds to the preselected track signal generated by the video disc controller, the cross point switcher 88 is switched over into a recording mode so that the video signal waiting in the scan converter 68 can be recorded on the selected track and disc. The same track identification data that was recovered through the track ID recovery circuit 90 is rerecorded back onto the same track by multiplexing it with the video signal. Thus, each time a track is recorded on the video disc memory, there is both a video signal and a multiplex track identifying signal simultaneously.

The Video Terminal

Each video terminal 24, FIG. 1, receives the analog video signals stored on the disc memory 22 via the cross point switcher 88 described above. In the preferred embodiment a plurality of video terminals are used and each includes a video monitor 92, a keyboard 94, and a character generator 96. The video monitor 92 is a commercial quality, 525 line TV monitor of known construction. Referring to FIG. 4, the TV monitor displays the video images stored in the video disc memory 22 and a line 100 of alpha-numeric characters. The video monitor can be operated in a blanking mode so that either both documents 98, 99 can be shown simultaneously or one at a time. In addition, the monitor can display the line of alpha-numeric characters either with or without the video image.

The keyboard 94 on the video terminal 24 is a standard, commercially available keyboard. The keyboard permits the operator of the terminal to display data on the video monitor using the character generator 96 described below and also to insert data into the computer 16.

The character generator 96, FIG. 1, is likewise a commercially available unit. The character generator takes the standard eight bit ASCII code for each character and converts that code into a letter that is displayed on the video monitor screen. The character generator actually controls the electron gun of the monitor so that the desired character or letter is painted on the screen. The character generator receives commands from both the computer 16 and the keyboard 94.

In operation, the video terminal is used in an interactive manner between the computer 16, FIG. 1, and the terminal operator. The computer can send messages to the terminal that are displayed on the monitor by the character generator. These messages appear on line 100, FIG. 4. The operator can read these messages and perform various tasks. The operator can respond to the system by entering data through the keyboard 94 and also verify the negotiability and authenticity of the documents 98, 99, FIG. 4, displayed on the screen of the monitor. The keyboard entries can also be made to appear on line 100. One important function of the video terminal is to permit the operator to enter the dollar amount of the bank check 98 into the digital disc memory 18 of the computer. This dollar amount is later printed on the check by the MICR encoder 28, FIG. 1.

Operation—Overview

In the remittance processing example of document processing the processing of both checks and remittance documents is accomplished in three steps: data acquisition, document processing, and document sorting and coding. During data acquisition the machine readable language printed on each document and the video image of each document is captured and stored in the system. During document processing the machine readable information and the images of the associated documents are displayed to the operators of the terminals 24 so that authenticity and negotiability can be ascertained along with key-entry of the dollar amount. In sorting and coding the remittance documents are sorted from the checks and the dollar amount of each check is automatically printed on the MICR line 106, FIG. 2, in the space 108.

Date Acquisition

Initially the documents are placed in alternating sequence of bank check, remittance document, bank check, etc. and oriented so that the scan line on each is properly positioned for the appropriate reader. When approximately one hundred to one hundred and fifty transactions have been sorted, a batch is made by placing header and trailer cards in front and behind the set of documents. The header cards contain MICR data that identify the account being processed, the number of the batch, and the program to be used by the computer.

The operator next places the batch into the feed hopper of the document scanner 14, FIG. 1. Thereafter the operator presses the start button (not shown) on the document scanner which signals the computer 16, FIG. 1, that a batch is ready to be run. The computer recalls the program for the microprocessor 30 from its digital disc memory 18 and refreshes the document scanner for the upcoming run. When the microprocessor 30 is ready, the computer issues a feed command and the transporter commences to feed the documents. The first document is a header card which is rolled into the transport by the feed roller 33, FIG. 5. When the header card passes under the MICR readhead 38, the MICR line on the header card is read. This MICR line carries both the identification number of the account and the batch number. The account number is transmitted to the computer 16 so that the program for that account is read from the digital disc memory 18. From this program the computer initializes the document scanner to read the particular format associated with the account. The document scanner is also ordered to commence acquiring check and remittance document images and digital data. All this time the header card passes through the transporter, FIG. 5 and is placed in the pocket 50.

The documents commence passing through the transporter at a rate of one hundred inches per second. The documents are transported in a continuous mode without stopping. Immediately thereafter the computer 16, FIG. 1, selects a video disc and positions the recording heads on a predetermined track via the video disc controller 86. In addition, the computer initializes one of the scan converters 68 via the video camera controller 67.

In the preferred embodiment the first document following the header card is a bank check 104, FIG. 2. When the check passes under the MICR read head 38, FIG. 5, the scanner reads the entire MICR line 106 off of the check. After pattern recognition, this data is transferred by the microprocessor 30 to the memory 31 of the document scanner. The check next advances from the MICR read head 38 and the subsequently following remittance document 110, FIG. 3, passes under the MICR read head. Since the remittance document has an OCR scan line 112, the MICR read head does not obtain any information from this document. The check 104 meanwhile passes over the OCR drum 42, FIG. 5. Since the check contains no OCR data, the OCR drum gives a negative read signal. When the remittance document 110 passes over the OCR drum 42, FIG. 5, the OCR scan line 112 is read and the data on the OCR scan line is stored by the microprocessor 30 in the memory 31.

When the leading edge of the check passes by the document sensor 48, FIG. 5, the video camera controller 67 is triggered. The document detection circuit 76, FIG. 6, notifies the computer through the UART 74 that a document is present at video camera 20. The document detection circuit also starts the X/Y deflection ramp generator 72. The computer through the scan converter control circuit 75 thereafter commands the selected scan converter to commence storing the signals received from the gray scale processor 73.

After the video image of the bank check is acquired by one of the scan converters, the leading edge of the remittance document triggers the whole process again when it passes document sensor 48. The image of the remittance document is captured in the same manner as described above. The images of both the check and the remittance document are combined into one composite image that is stored as one frame in the selected scan converter. Also, during this time the machine readable data obtained from the two documents is transferred from the microprocessor memory 31 to the digital disc memory 18 of the computer. In the meantime the documents are consecutively pocketed by the document scanner so that the original order is maintained. When one pocket is filled the scanner begins filling an adjacent pocket.

This sequence of reading and capturing images of checks and remittance documents is repeated over and over for all the documents in the batch. The end of the batch is signaled by the passage of a trailer card under the MICR readhead 38, FIG. 5.

Referring to FIG. 1, while the video camera 20 is recording the fast moving documents, the video camera controller 67 is directing the images two by two between the scan converters 68 in an alternating sequence. The selection is controlled by the computer. In addition, while one scan converter is receiving video data from the camera, the other scan converter is passing its data onto the disc memory 22. The record processor 84 in a similar manner switches back and forth between the scan converters. The record processor also converts the base band analog video signal from the selected converter into a form suitable for recording onto the disc. The discs and track locations where the video images are stored are selected by the computer through the video disc controller 86.

When data acquisition is completed, the image of each check and remittance document is recorded on one of the tracks in the video disc memory 22. The location of the image in video disc memory and the machine readable data read from each of the documents are stored together in the digital disc memory 18.

Document Processing

Document processing begins when an operator signs on to the system at one of the video terminals 24, FIG. 1. The computer thereafter designates a batch of documents located in the digital and video memories 18, 22 to that operator. Actually processing begins when the image 98 of the first check is displayed on the screen of the video monitor 92, FIG. 4. The terminal operator scans the image of the check and determines whether the check is negotiable. If the check is negotiable, the terminal operator enters the dollar amount of the check through the keyboard 94, FIG. 1. Under other procedures the operator compares the dollar amount of the check with the amount read from the OCR document 99. The dollar amount of the check is stored in the digital disc memory 18 along with the data obtained from the MICR line 106, FIG. 2, previously read by the scanner. At this point, the digital disc memory contains the dollar amount of the check, the MICR line from the check, the OCR line from the OCR document, and the address of where the image of the check is located in the video disc memory 22.

After the image of the check 98, FIG. 4, is displayed on the terminal, the image of the remittance document 99 is displayed. The operator then compares the dollar amount of the check with the amount specified on the remittance document. Depending on the desires of the payee of the account, the operator of the terminal can make various entries via the keyboard 94 based upon the visual image of the two documents.

After the interactive session between the computer and the terminal operator has been completed, the terminal operator commands the computer to display the image of the check in the next transaction. The image of the check is scanned for negotiability and the same sequence described above is repeated. Each transaction is thus processed until the entire batch is completed. Then the computer releases the video disc for rerecording.

Character Rejection Processing

If during the course of the above-described processing some of the OCR or MICR characters were not recognized by the character recognition circuits in the document scanner 14, FIG. 1, the terminal operator is asked by the computer to supply the correct character(s). This is accomplished by displaying the video image of the document in question and its recognized MICR or OCR line on the terminal. A special code is displayed in place of the rejected or non-recognized characters. This codes indicates to the terminal operator that key correction must be performed. The terminal operator looks at the video image of the document and determines the correct character to enter. The correct character is then key-entered by the terminal operator without having to revert to the physical document. After the operator has key corrected the rejected character(s), the document processing procedure reverts to normal.

Document Sorting and Encoding

After a batch of documents has been run through the document scanner 14, FIG. 1, the documents are temporarily stored. When all the document images and data have been processed by the terminal operator, the documents are removed from storage and placed in the input feed hopper of the document reader/sorter 26, FIG. 1. The operator of the document reader/sorter presses the start button and the computer 16 commands the sorter to commence separating documents. The header card is read in the manner described above and the system is initialized by the computer.

The checks and remittance documents begin to pass through the transporter and to be read by the MICR read head 38' and the OCR head 45'. The data that is read from these documents is compared with the data stored on the digital disc memory 18. This is a verification to insure that the documents are in proper sequence after storage. The reader/sorter thereafter separates the remittance documents according to a predetermined sequence or based upon the terminal operator's instructions and the checks are likewise separated into a separate pocket.

Once all of the documents in a batch have passed through the reader/sorter 26, FIG. 1, the operator removes the remittance documents from the machine. Depending on the wishes of the payee of the account, the remittance documents are either destroyed or forwarded for subsequent processing.

The checks are likewise removed from the reader/sorter and are transferred by the operator to the MICR encoder 28. The checks are placed in the feed hopper (not shown) of the MICR encoder and the operator starts the transporter. The MICR line 106, FIG. 2, of each check is read and compared with the MICR data previously stored in the digital disc memory 18, FIG. 1. If the MICR data agrees, the computer takes the dollar amount of the check which was entered by the terminal operator during document processing and commands the MICR encoder to print that amount on the check. The dollar amount of the check in MICR is placed in the space indicated by reference numeral 108, in FIG. 2. After printing the check passes through the transport and is stored in a pocket (not shown). This sequence is repeated for each check in the batch. When all of the checks in the batch have been encoded, the operator of the MICR encoder removes the batch from the machine and transfers the checks on to another department in the bank for subsequent processing.

Depending upon the needs of the payee of the account, the data from the checks and remittance documents can be recorded onto magnetic tape using the tape transport 18. The magnetic tapes, for example, can be recorded so as to contain the account numbers and the amount paid by the remitters in each transaction. These magnetic tapes are forwarded to the account payee for processing in its bookkeeping department.

Other Operating Modes

If the remittance documents cannot be run through the document scanner 14, FIG. 1, because of size or material incompatibility, the preferred embodiment is operated with the images of the checks being captured and data from the remittance documents entered manually. In this mode, the checks are made up into a batch and run through a document scanner 14 so that both the MICR line 106, FIG. 2, and the video image of the check is captured. The image of the check is stored in the video analog disc memory 22 and the data from the MICR line along with the address of the check image is stored in the digital disc memory 18. After all of the checks have been run through the scanner, the operators at the video terminals 24, FIG. 1, call up one by one the stored images of the checks. From the image of the check the operator determines if the check is of proper form and negotiable. The operator enters any rejected MICR characters as in the earlier description and the dollar amount of the check in the digital disc memory 18 via the keyboard 94. The operator also manually enters the accounting data from the corresponding remittance document which the operator holds in hand at the terminal. The operator thus reviews the documents by hand as the checks are projected on the video monitor 92.

If the remittance documents are not encoded with machine readable data but can be run through the document scanner 14, FIG. 1, then the system is operated to capture the images of both the documents and checks. The documents and checks are both run through the document scanner 14, FIG. 1, in the same manner described above, and the images are stored in the analog disc memory 22, FIG. 1. The MICR line 106, FIG. 2, from the check is stored in the digital disc memory 18 along with the addresses of the images stored in the analog video memory. Next the images of the checks and remittance documents are displayed one by one at the video terminals. The operators determine the dollar amount of the checks and the accounting data on the remittance documents from the stored images. The dollar amounts and the accounting data are entered into the digital disc memory 18 via the keyboard 94.

Further, the above-described system can be used to process just checks alone. The checks are made up into a batch and run through the document scanner 14, FIG. 1, in the manner described above. When the images of the checks are displayed one by one on the video terminal, the operator determines if the check is of proper form and negotiable. The operator next enters the dollar amount of the check into the digital disc memory 18 via the keyboard 94. After all of the checks have been displayed and the dollar amount of each check entered in the disc memory, the checks are run through the MICR encoder 28, FIG. 1. The MICR encoder prints the dollar amount of each check along the lower margin of the check in space 108, FIG. 2.

If the documents can be run through the document scanner but carry no machine readable data, the system can be operated in a video only mode. The documents are run through the document scanner in the manner described above. After the image of each document has been captured and stored, the terminal operator displays one by one the stored images of the documents. The terminal operator enters via the keyboard the accounting data visible from the images.

Image Capture of Both Sides of the Document

When processing cancelled checks and other documents where information is printed on both sides of the documents, the document processing system described above is modified by adding a second video imaging system. A second video camera, a second light source, and a second video camera controller are used. These components are constructed and operate in the same manner as the first camera system described above. As illustrated in FIG. 5, the first video camera system is positioned to look upward at the passing documents in the transport. The second video camera (not shown) is positioned in the path of the documents to look down at the other side of the documents in the transport. The computer 16, FIG. 1, is programmed to store the two images in the analog disc memory 22, FIG. 1, and to display on command the two images on the video monitors 92.

General Use In Document Processing

Although the above description of the preferred embodiment describes in detail the remittance processing procedure commonly performed in banks, this invention contemplates general use in any document processing system where it is desirable to obtain image information from the documents being processed. In the present system the entire image of each document is recorded and subsequently displayed as needed. The system is not limited to the display of a single scan line or to a small field of the document. Moreover, the system can be operated simultaneously by a plurality of operators so that documents can be captured while others are being displayed. Further, the system can be modified so that one document or many documents can be displayed at one time on the same video monitor. The invention can also be used in a bank's check processing operation for the initial encoding, capture, and balancing of batches of checks.

Digital Video Image Processing

In general, the digital embodiment illustrated in FIG. 9. operates in the same manner as the analog embodiment of FIG. 1 described above. The document scanner 14 sequentially passes documents by both a machine readable data reader and a video camera 20. The data reader reads and stores in the digital disc memory 18 the machine readable data encoded on the documents. The image of each document is captured by the video camera and both the machine readable data and the video images of the documents are displayed at a plurality of video terminals 136.

In FIG. 9 however the video image of each document is digitized in the video camera controller 130 and is stored in digital form in the digital disc memory 132. As needed the video images of the documents are transferred in digital form from the memory 132 to a refresh buffer 134 located in each terminal and the images are thereafter displayed on a video monitor 138.

The video camera 20, FIG. 9 in the document scanner 14 is constructed and operates in the same manner as described above. Within the video camera is a solid state, line scanner which includes a high density, monolithic linear array of silicon photo detectors or diodes. In one embodiment actually constructed the array consists of a row of one thousand and twenty four silicon photo detectors each of which is sensitive to the intensity of the light reflected by the document. When the document being imaged is moved across the filed of the line sanner, a two dimensional scan of the document is created as illustrated in FIG. 7. The output signal from the line scanner is a series of pulses corresponding to each intensity sample made by a photo detector. In the embodiment actually constructed, each document is represented by 393,216 of these pulses which correspond to 384 picture elements in width and 1,024 picture elements in length.

The video data from the video camera 20, FIG. 9 is passed to a video camera controller 130 which digitizes the pulses from the line scanner and converts the video information into sixteen bit words that are transferred in parallel to one of three scan converters 141, 141', and 141''. The video camera controller is described in detail below. The three scan converters are identical and each has a commercially available buffer memory of sufficient size to store a complete frame of video data. Each scan converter sequentially stores the sixteen bit words from the video camera controller 130 in its buffer memory. The purposes of scan converters are to change the scan rate of the video camera 20 and to combine the images of two documents such as a check and a remittance document into a single frame of video. The scan converters also are capable of inverting images of the documents if necessary. Multiple scan converters are used in order to provide sufficient time to record the output from the video camera, to transfer the digitized video information to the disc memory 132, and to erase the scan converter afterwards. The scan converters are each cycled through these three steps in turn and one after the other.

After a complete frame of video is stored in one of the scan converters 141, the data is transferred to the video image storage device which is a digital disc memory 132. The disc memory includes a plurality of commercially available disc drives which provide mass storage for the digitized video images. In the embodiment actually constructed the digital disc memory included four 80 mega-bite disc drives which can store thirty two hundred frames of video data.

When a new frame of video is required by an operator at one of the terminals 136, the dats is transferred from the digital disc memory 132, FIG. 9 to a refresh buffer 134 in the terminal. There is a refresh buffer in each remote terminal so that the digital disc memory 132 is not required to continuously feed a specific frame of video data to the video monitor. The refresh buffer provides a transition between the disc memory 132 which has an output rate of ten million bits per second and the video monitor 138 which requires thirty five million bits per second in order to avoid having the display flicker. Each refresh buffer includes a solid state dual port memory. Both ports can be operated simultaneously. One port is a high speed, read only port for transferring video data to the video monitor at thirty-five million bits per second. This port reads out from the buffer memory, serializes the video data, and adds sync pulses to form a composite video signal for the video monitor 138. The second port in the refresh buffer can both be read from and written into and receives the digitized data from the digital disc memory 132. This second port has a capacity of ten million bits per second.

Each video terminal 136, FIG. 9 also includes a video monitor 138, a keyboard 94, and a character generator 96. The video monitor is a commercial quality eleven hundred and twenty-five line TV monitor of known construction. Referring to FIG. 4, the TV monitor displays the video images stored in the refresh buffer 134 and a line 100 of alpha-numeric characters. The video monitor can be operated in a blanking mode so that the documents 98, 99 can be shown either simultaneously or one at a time. In addition, the monitor can display the line of alpha-numeric characters either with or without the video image. The keyboard 94 on the video terminal 24 is a standard, commercially available keyboard. The keyboard permits the operator of the terminal to insert data into the computer 16 and to display data on the video monitor using the character generator 96. The character generator 96, is likewise a commercially available unit. The character generator takes the standard eight bit ASCII code for each character and converts that code into a letter that is displayed on the video monitor screen. The character generator receives commands from both the computer 16 and the keyboard. As described above, the character generator and the words that it generates are used to prompt the operator, to display the operator's responses and to request directions from the operator on behalf of the computer. Both the keyboard and the character generator have direct access to the computer 16 and, insofar as alpha-numeric data transfer is concerned, the connections between the computer and the terminals are similar to a standard CRT terminal interface.

The transfer of video data between the video camera controller 130, the scan converters 141, the digital disc memory 132 and the refresh buffers 134 is sequenced and controled by a video system controller 144, FIG. 9. This controller monitors, schedules and regulates the interactions between all of the video devices in the system. The video system controller receives commands from the computer 16 and contains both a micro computer and a time slot allocator for the video transfer bus 140. The video transfer bus transfers the video signals between the various video devices and acts like a cross-point switcher. The transfer bus has an aggregate capacity of one hundred million bits per second and transfers sixteen bit words in parallel. The micro computer establishes the communication paths between the various video devices and the time slot allocator designates short time intervals during which the data can be transferred. The video system controller and the video transfer bus permit time division multiplexing of the video signals so that there can be simultaneous data transfer between, for example, the video camera controller and a scan converter and between the digital disc memory and a refresh buffer. The video system controller also commands the video disc controller (not shown) in the digital disc memory 132 so that the frames of video data can be recalled on command and transferred to a selected refresh buffer.

The document processing system FIG. 9 also includes a point plotter 146 that is controlled by the video system controller 144. If an operator at one of the video terminals 136 desires to print a permanent copy of one of the frames of video data, the point plotter is actuated by the keyboard 94 to print out the digitized video data stored in the digital disc memory 132.

Digital Video Camera Controller

The video camera controller 130 for the video camera 20 is illustrated in FIG. 10. The camera controller digitizes the output of the video camera and transfers the digitized data to one of three scan converters 141. The video camera controller 130 includes a clock 150 that generates a 6.5 megahertz output signal. The output from the clock is passed to a line scan camera control 152. The camera control is connected to the optical line scanner in the video camera 20 described above. The camera control provides the clocking pulses for sampling the photo detectors in the optical line scanner. The line scan camera control also provides to the line scanner a start pulse and the power to operate. The video camera runs continuously and is not gated on and off. The video camera is constructed and operates in the same manner as described above in connection wtih FIG. 6.

The video output signal from the video camera 20 is passed through an amplifier 64 and an image processor 156. The image processor includes a linear phase filter which enhances the light to dark and dark to light transitions in the picture elements detected by the video camera. The image processor also has an adaptive threshold circuit that compensates for variations in the backgrounds of the various documents scanned by the system. The entire adaptive threshold circuit ensures that the subtle background variations on the documents are not displayed on the video monitors 138, FIG. 1.

The image processor 156, FIG. 10 is connected to an analog to digital (A/D) converter 154 which digitizes the output signals from the image processor. The A/D converter receives clocking pulses from the line scan camera control 152 that define when the signals from the image processor represent output signals from the line scanner in the video camera. The video camera is not gated on and off. The purpose of the image processor and the one bit grey scale A/D converter is to generate high contrast images. Any variations in background on the documents appears white on the video monitors and the writing on the checks and documents appears black. The output of the A/D converter is a single bit corresponding to each picture element on the document being imaged. A typical document is divided into 393,216 picture elements (384 elements wide and 1,024 elements long). Each bit indicates whether the corresponding picture element is either white or black.

The video camera controller 130, FIG. 10 is controlled by commands received from the video system controller 144 through a universal asynchronous receiver/transmitter (UART) 74 of known construction. The UART is constructed and operates in the same manner as described above in connection with FIG. 6.

The video camera controller 130 is synchronized by the passage of each document through the document scanner 14, FIG. 1. The leading edge and the presence of each document is detected by a document sensor 48. This sensor is located on the lower document transport 47, FIG. 5. The output of the document sensor 48 is passed to a document detection circuit 76, FIG. 10, that indicates the arrival of the document to the microprocessor 158 and the video system controller 144. The document detection circuit also starts the A/D converter 154 so that the output signals from the image processor 156 are digitized. The output of the A/D converter is passed to a serial to parallel converter 160. This converter is a shift register which permits sixteen pulses to be shifted in serially from the A/D converter and to be shifted out in parallel to the video transfer bus 140.

When the document has passed the video camera 20, FIG. 10 and the document sensor 48, the document detection circuit 76 turns off the A/D converter 154 and notifies the video system controller 144 through the microprocessor 158 that the capture of one document image is complete.

The output of the video camera controller 130, FIG. 10 is a series of sixteen bit words in parallel from the serial to parallel converter 140. Each bit identifies a picture element as either white or black. The picture elements correspond to light intensity pulses from the video camera photo detectors. The picture elements are ordered in the same sequence as the document is scanned, FIG. 7.

Digital Operation

It should be understood that remittance processing as described above can be performed using either the analog or the digital embodiment. In each case the operators at the video terminals 136 perform their tasks of data acquisition, document processing and document sorting and coding in the same manner.

In operation, the document scanner 14 transports documents by both a machine readable data reader 38, 45, FIG. 1 and a video camera 20. The machine readable data is read and stored in the digital disc memory 18, FIG. 9. The video camera records the image of each document as a series of pulses, one pulse per picture element. The pulses are digitized in the video camera controller 130 by the A/D converter 154, FIG. 10. The transitions and edges of the writings on the documents are sensed by the image processor 156, FIG. 10 so that high contrast video pictures are obtained. The digitzed data is transferred through one of the scan converters 141 and is stored in the digital disc memory 132.

The digitized video data in the disc memory 132 is transferred as needed to a refresh buffer 134 in a video terminal 136. The image data is thereafter displayed on a video monitor 134 which is connected to the refresh buffer.

Thus, although the best modes contemplated for carrying out the present invention have been herein shown and described, it will be apparent that modification and variation may be made without departing from what is regarded to be the subject matter of the invention.

What is claimed is:

1. Apparatus for processing documents, comprising:
   (a) means for reading and storing machine readable data encoded on a document being processed;
   (b) a video camera for capturing the image of the document being processed, said camera having an analog output signal;
   (c) video memory means connected to the video camera for storing the analog signal corresponding to the image of the document captured by said camera; and
   (d) means for passing the document by both the reading means and the video camera, said document passing means being operatively connected to both the reading means and the video camera.

2. The apparatus of claim 1 further including means connected to both the machine readable data storing means and the video memory means for displaying the stored image of the document and the stored machine readable data encoded thereon.

3. The apparatus of claim 2 wherein the display means includes a video terminal having means for controlling the apparatus such that an operator of the apparatus can recall and observe on command on the display means either or both the stored machine readable data and the stored video image of the document, said video terminal being operatively connected to the display means.

4. The apparatus of claim 2 wherein the display means includes means for inserting data into the machine readable data storing means based on the video image of the document displayed on the display means, said data inserting means being operatively connected to the display means.

5. The apparatus of claim 1 wherein said video camera captures the total image of one side of a document being transported to the document passing means and the total image is stored in the video memory as an analog signal, said video camera and video memory being connected together for said storing.

6. Apparatus for processing documents, comprising:

(a) a video camera for capturing the image of a document being processed, said camera having an analog output signal;
(b) video memory means connected to the video camera for storing the analog signal corresponding to the image of the document captured by said camera; and
(c) a document transporter connected to the video camera for passing the document by the video camera.

7. The apparatus of claim 6 further including:
(a) means operatively connected to the document transporter for reading and storing machine readable data encoded on the document being processed; and
(b) means connected to both the machine readable data storing means and the video memory means for displaying the stored image of the document and the stored machine readable data encoded thereon.

8. The apparatus of claim 7 wherein the display means includes means operatively connected thereto for inserting data into the machine readable data storing means based on the video image of the document.

9. The apparatus of claim 7 wherein the display means includes a video terminal connected thereto having means for controlling the apparatus such that an operator of the apparatus can recall and observe on said display means on command either or both the stored machine readable data and the stored video image.

10. The apparatus of claim 6 wherein the video camera captures the total image of one side of a document being transported by the document passing means and the entire image of one side of the document is stored in the video memory as an analog signal, said video camera and video memory being connected together for said storing.

11. The apparatus of claim 6 further including:
(a) a second video camera operatively connected to said document transporter and to the video memory means, said first named camera being positioned with respect to the document transporter for capturing the image of one side of the document being processed and said second named camera also being positioned with respect to the document transporter for capturing the image of another side of the document.

12. Apparatus for processing documents, comprising:
(a) means for reading and storing machine readable data encoded on a document being processed;
(b) an optical line scanner for capturing the image of the document being processed, said scanner laterally scans the document and has an analog output signal;
(c) means connected to the scanner for transforming the lateral scan output signal into an analog television raster scan signal;
(d) video memory means connected to the transforming means for storing the analog television signal corresponding to the image of the document captured by the scanner;
(e) means for passing the document by both the reading means and the optical line scanner, said means being operatively connected to both said reading means and said line scanner; and
(f) a video display screen scanned in raster fashion connected to both the machine readable data storing means and the video memory means for displaying either or both the stored image of the document and the stored machine readable data encoded thereon.

13. The apparatus of claim 12 wherein the document passing means moves the document in a direction perpendicular to the direction of scan of the optical line scanner.

14. The apparatus of claim 12 further including gray scale processing means connected to the output of the optical line scanner.

15. The apparatus of claim 12 further including:
   (a) a second optical line scanner operatively connected to said document passing means and to the video memory means, said first named scanner being positioned with respect to said document passing means for capturing the image of one side of the document being processed and said second named scanner also being positioned with respect to said document passing means for capturing the image of another side of the document.

16. Apparatus for capturing the images of documents moving at a high speed, comprising:
   (a) a light source for generating and directing light onto a moving document;
   (b) means operatively connected to the light source for passing the document along a path through the light;
   (c) an optical line scanner operatively connected to the document passing means for receiving the image containing light from the document, said scanner scans in a direction lateral to the path of the document, said scanner also converts the image containing light into corresponding analog electrical signals; and
   (d) means connected to the line scanner for storing the analog electrical signals corresponding to the image of the document.

17. The apparatus of claim 16 further including means connected to the signal storing means for displaying the stored image of the document.

18. The apparatus of claim 17 further including means connected to the display means for commanding the display of stored document images.

19. The apparatus of claim 16 further including means connected to the signal storing means for displaying simultaneously the stored images of two captured documents.

20. The apparatus of claim 16 further including:
   (a) converting means connected to the optical line scanner for converting the electrical signals therefrom into television raster signals; and
   (b) a video display screen scanned in raster fashion operatively connected to the converting means for displaying the stored image of the document.

21. The apparatus of claim 20 wherein the converting means includes:
   (a) two scan converters connected in parallel between the optical line scanner and the storage means; and
   (b) switching means connected thereto for connecting the converters in alternating sequence between the optical line scanner and the storage means.

22. Apparatus for encoding checks, comprising:
   (a) means for reading and storing the machine readable data encoded on a check being processed;
   (b) a video camera for capturing the image of the check being processed, said camera having an analog output signal;
   (c) means for passing the check by both the reading means and the video camera, said check passing means being operatively connected to both the reading means and the video camera;
   (d) video memory means connected to the video camera for storing the analog signal corresponding to the image of the check captured by said camera;
   (e) a video terminal connected to both the machine readable data storing means and the video memory means for displaying the stored image of the check;
   (f) means at the video terminal for inserting the dollar amount of the check being processed into the machine readable data storing means based on the video image of the document; and
   (g) means operatively connected to the data storing means for encoding the check with its dollar amount in machine readable language.

23. Method for processing documents, comprising the steps of:
   (a) passing a document to be processed by both a machine readable data reader and a video camera using document transporting means, said data reader and video camera being operatively connected to said transporting means;
   (b) reading the machine readable data encoded on the document using the data reader and storing the data in a digital memory, said digital memory being connected to the data reader for said storing;
   (c) capturing the image of the document with the video camera; and
   (d) storing as an analog signal in a video memory the image of the document captured by the camera, said video memory being connected to the video camera for said storing.

24. The method of claim 23 further including the step of:
   (a) displaying on command at a display means the stored image of the document and/or the machine readable data read from said document, said display means being operatively connected to the video memory.

25. The method of claim 24 further including the steps of:
   (a) recording data in the digital memory based on the stored image of the document displayed at the display means; and
   (b) encoding on said document the image based recorded data using encoding means, said encoding means being connected to the digital memory.

26. The method of claim 23 further including the step of:
   (a) converting the captured image of the document into an analog television raster scan signal for storing in the video memory using scan converting means, said converting means being operatively connected to both said video camera and said video memory.

27. Method for processing checks having dollar amounts and encoded machine readable data thereon, comprising the steps of:
   (a) transporting a check by both a machine readable data reader and a video camera using document transporting means, said data reader and video camera being operatively connected to said transporting means;
   (b) reading the machine readable data encoded on the check using the data reader and storing said data in a digital memory, said data reader being connected to the digital memory;

(c) capturing the image of the check with the video camera, said camera having an analog output signal;

(d) storing the analog video signal representing the image of the check in a video memory, said video memory being connected to the video camera for said storing;

(e) displaying on command at a display means the image of the check, said display means being operatively connected to the video memory; and (f) storing the dollar amount of the check in the digital memory with the associated machine readable data read from the check.

28. The method of claim 27 further including the step of:

(a) encoding the check with its dollar amount in machine readable language from the data stored in the digital memory using check encoding means, said encoding means being connected to the digital memory.

29. The method of claim 27 further including the step of:

(a) storing data in the digital memory obtained from a document associated with the check using data input means, said input means being connected to the digital memory, said data from the document being stored with the machine readable data read from the check by the data reader.

30. Method for processing remittance documents and checks, said checks having dollar amounts and encoded machine readable data thereon, comprising the steps of:

(a) transporting a remittance document and an associated check by both a machine readable data reader and a video camera using document transporting means, said data reader and video camera being operatively connected to said transporting means;

(b) reading the machine readable data encoded on the check using the data reader and storing said data in a digital memory, said data reader being connected to the digital memory;

(c) capturing the images of the remittance document and the check with the video camera, said camera having an analog output signal;

(d) storing the analog video signal representing the images of the check and the remittance document in a video memory, said video memory being connected to the video camera for said storing;

(e) displaying on command the image of the check on a display means, said display means being operatively connected to the video memory;

(f) storing the dollar amount of the check in the digital memory with the associated machine readable data encoded on the check;

(g) displaying on command the image of the remittance document on the display means; and (h) storing data in the digital memory based on a comparison of video images of the remittance document and the check.

31. The method of claim 30 further including the step of:

(a) encoding the check with its dollar amount in machine readable language from the data stored in the digital memory using encoding means, said encoding means being connected to the digital memory.

32. The method of claim 30 further including the steps of:

(a) reading the machine readable data encoded on the remittance document and storing said data in the digital memory; and (b) displaying on command the image of the remittance document and the machine readable data read therefrom on the display means, said display means being operatively connected to the digital memory.

33. Method for processing documents having both electronically recognizable and electronically unrecognizable machine readable data encoded thereon, the data recognition being performed by a machine readable data reader, comprising the steps of:

(a) passing a document to be processed by both the machine readable data reader and a video camera using document transporting means, said data reader and video camera being operatively connected to said transporting means;

(b) reading the machine readable data encoded on the document with the data reader;

(c) recognizing and storing in a digital memory the data electronically recognizable by the data reader, said digital memory being connected to the data reader;

(d) coding the data electronically unrecognizable by the data reader and storing the code indicating this data in the digital memory;

(e) capturing the image of the document with the video camera;

(f) storing as an analog signal in a video memory the image of the document captured by the camera in a video memory, said video memory being connected to the video camera;

(g) displaying at a display means the stored image of the document and the code indicating the unrecognized data on the document, said display means being connected to both the video and the digital memories; and (h) recording in the digital memory data corresponding to the unrecognized data, said recorded data being based on the stored image of the document displayed at the display means.

34. Apparatus for processing documents, comprising:

(a) a video camera for capturing the image of a document being processed and having an output signal corresponding thereto;

(b) video memory means connected to the video camera for storing the signal corresponding to the image of the document captures by said camera;

(c) means for reading and storing machine readable data encoded on the document being processed; and (d) a document transporter for passing the document by the video camera and the document reading means, said video camera and reading means being connected to the transporter.

35. The apparatus of claim 34 further including:

means connected to both the machine readable data storing means and the video memory means for displaying the stored image of the document and the stored machine readable data encoded thereon.

36. The apparatus of claim 35 wherein the display means includes means for inserting data into the machine readable data storing means based on the video image of the document.

37. The apparatus of claim 35 wherein the display means includes a video terminal having means for controlling the apparatus such that an operator of the apparatus can recall and observe on command on the display means either or both the stored machine readable data and the stored video image of the document, said video terminal being operatively connected to the display means.

38. The apparatus of claim 34 wherein the video camera captures the total image of one side of a document being transported by the document transporter and the entire image of one side of the document is stored in the video memory.

39. Method for processing documents, comprising the steps of:
   (a) passing a document to be processed by both a machine readable data reader and a video camera using document transporting means, said data reader and video camera being operatively connected to said transporting means;
   (b) reading the machine readable data encoded on the document using the data reader and storing the data in a digital memory, said digital memory being connected to the data reader for said storing;
   (c) capturing the image of the document with the video camera; and
   (d) storing in a video memory the image of the document captured by the camera, said video memory being connected to the video camera for said storing.

40. The method of claim 39 further including the step of:
   (a) displaying on command at a display means the stored image of the document and/or the machine readable data read from said document, said display means being operatively connected to the video memory.

41. The method of claim 40 further including the steps of:
   (a) recording data in the digital memory based on the stored image of the document displayed at the display means; and
   (b) encoding on said document the image based recorded data using encoding means, said encoding means being connected to the digital memory.

42. The method of claim 39 including the step of:
   printing on a tangible medium with plotting means the stored image of the document and/or the machine readable data read from said document, said plotting means being operatively connected to the video memory.

43. Apparatus for processing documents, comprising:
   (a) means for reading and storing machine readable data encoded on a document being processed;
   (b) video camera means for capturing the image of the document being processed and for converting the captured image into a digital signal;
   (c) means for passing the document by both the reading means and the video camera means, said document passing means being operatively connected to both the reading means and the video camera means; and
   (d) video memory means connected to the video camera means for storing the digital signal corresponding to the image of the document captured by said camera means.

44. The apparatus of claim 43, further including means connected to both the machine readable data storing means and the video memory means for displaying the stored image of the document and the stored machine readable data encoded thereon.

45. The apparatus of claim 44 wherein the display means includes a video terminal having means for controlling the apparatus such that an operator of the apparatus can recall and observe on command on the display means either or both the stored machine readable data and the stored video image, said video terminal being operatively connected to the display means.

46. The apparatus of claim 44 wherein the display means includes means for inserting data into the machine readable data storing means based on the video image of the document displayed on the display means, said data inserting means being operatively connected to the display means.

47. The apparatus of claim 43 wherein said video camera means captures the total image of one side of a document being transported by the document passing means by the camera means and the total image is stored in the video memory as a digital signal, said video camera and video memory being connected together for said storing.

48. The apparatus of claim 43 further including:
   (a) second video camera means operatively connected to said document passing means and to the video memory means, said first named camera being position with respect to the document passing means for capturing the image of one side of the document being processed and said second named camera also being positioned with respect to the document passing means for capturing the image of another side of the document.

49. The apparatus of claim 43 including: means connected to both the machine readable data storing means and the video memory means for printing on a tangible medium the stored image of the document and/or the machine readable data read from said document.

50. Apparatus for processing documents, comprising:
   (a) means for reading and storing machine readable data encoded on a document being processed;
   (b) an array of photo detectors for capturing the image of the document being processed and means connected thereto for sampling the outputs of the photo detectors in turn as the document passes the array, the outputs of the photo detectors being a series of electrical pulses corresponding to the image of the document at the points sampled by the photo detectors, a composite image of the document being represented by a plurality of picture elements, each picture element corresponding to a point on the document sampled by a photo detector;
   (c) means connected to the array of photo detectors for converting the series of electrical pulses therefrom into digital signals representing the image of the document;
   (d) video memory means connected to the converting means for storing the digital signals corresponding to the image of the document captured by the photo detector array;
   (e) means for passing the document by both the reading means and the array of photo detectors, said means being operatively connected to both said reading means and said array; and
   (f) a video display screen scanned in raster fashion connected to both the machine readable data storing means and the video memory means for displaying either or both the stored image of the document and the stored machine readable data encoded thereon.

51. An apparatus as in claim 50 wherein the converting means includes a phase filtering circuit for converting the electrical pulses from the photo detectors into digital signals representing either black or white picture elements.

52. Apparatus for encoding checks, comprising:
(a) means for reading and storing the machine readable data encoded on a check being processed;
(b) video camera means for capturing the image of the check being processed and for converting the captured image into a digital signal;
(c) means for passing the check by both the reading means and the video camera means, said check passing means being operatively connected to both the reading means and the camera means;
(d) video memory means connected to the video camera for storing the digital signal corresponding to the image of the check captured by said camera;
(e) a video terminal connected to both the machine readable data storing means and the video memory means for displaying the stored image of the check;
(f) means connected to the machine readable data storing means for inserting the dollar amount of the check into the machine readable data storing means based on the video image of the document; and
(g) means operatively connected to the data storing means for encoding the check being processed with its dollar amount in machine readable language.

53. Method for processing checks having dollar amounts and encoded machine readable data thereon, comprising the steps of:
(a) transporting a check by both a machine readable data reader and a video camera using document transporting means, said data reader and video camera being operatively connected to said transporting means;
(b) reading and storing the machine readable data encoded on the check in a digital memory using the data reader, said data reader being connected to the digital memory;
(c) capturing the image of the check with video camera means;
(d) converting the captured image of the check into a digital signal with said video camera means;
(e) storing the digital signal representing the image of the check in a video memory, said video memory being connected to the video camera for said storing;
(f) displaying on command at a display means the image of the check, said display means being operatively connected to the video memory; and
(g) storing the dollar amount of the check in the digital memory with the associated machine readable data read from the check.

54. The method of claim 53 further including the step of:
(a) encoding the check with its dollar amount in machine readable language from the data stored in the digital memory using check encoding means, said encoding means being connected to the digital memory.

55. The method of claim 53 further including the step of:
(a) storing data in the digital memory obtained from a document associated with the check using data input means, said input means being connected to the digital memory, said data from the document being stored with the machine readable data read from the check by the data reader.

56. Method for processing remittance documents and checks, said checks having dollar amounts and encoded machine readable data thereon, comprising the steps of:
(a) transporting a remittance document and an associated check by both a machine readable data reader and a video camera using document transporting means, said data reader and video camera being operatively connected to said transporting means;
(b) reading the machine readable data encoded on the check using the data reader and storing said data in a digital memory, said data reader being connected to the digital memory;
(c) capturing the images of the remittance document and the check with the video camera, said camera having a digital output signal;
(d) storing the digital video signal representing the images of the check and the remittance document in a video memory, said video memory being connected to the video camera for said storing;
(e) displaying on command the image of the check on a display means, said display means being operatively connected to the video memory;
(f) storing the dollar amount of the check in the digital memory with the associated machine readable data encoded on the check;
(g) displaying on command the image of the remittance document on the display means; and
(h) storing data in the digital memory based on a comparison of video images of the remittance document and the check.

57. The method of claim 56 further including the step of:
(a) encoding the check with its dollar amount in machine readable language from the data stored in the digital memory using check encoding means, said encoding means being connected to the digital memory.

58. The method of claim 56 further including the steps of:
(a) reading the machine readable data encoded on the remittance document and storing said data in the digital memory; and
(b) displaying on command the image of the remittance document and the machine readable data read therefrom on the display means, said display means being operatively connected to the digital memory.

59. The method of claim 56 including the step of:
printing on a tangible medium with plotting means the stored image of the document and/or the machine readable data read from said document, said plotting means being operatively connected to the video memory.

60. Method for processing documents having both electronically recognizable and electronically unrecognizable machine readable data encoded thereon, the data recognition being performed by a machine readable data reader, comprising the steps of:
(a) passing a document to be processed by both the machine readable data reader and a video camera using document transporting means, said data reader and video camera being operatively connected to said transporting means;
(b) reading the machine readable data encoded on the document with the data reader;

(c) recognizing and storing in a digital memory the data electronically recognizable by the data reader, said digital memory being connected to the data reader;
(d) coding the data electronically unrecognizable by the data reader and storing the code indicating this data in the digital memory;
(e) capturing the image of the document with the video camera;
(f) storing in a video memory the image of the document captured by the camera in a video memory, said video memory being connected to the video camera;
(g) displaying at a display means the stored image of the document and the code indicating the unrecognized data on the document, said display means being connected to both the video and the digital memories; and
(h) recording in the digital memory data corresponding to the unrecognized data, said recorded data being based on the stored image of the document displayed at the display means.

* * * * *

Disclaimer 4,205,780.—*Emmett R. Burns*, Danville; *Morris D. Ho*, Walnut Creek, Calif. DOCUMENT PROCESSING SYSTEM AND METHOD. Patent dated June 3, 1980. Disclaimer filed Nov. 22, 1982, by the assignee, *ROI Consulting, Inc.*

Hereby enters this disclaimer to claims 6, 10, 11, 16, 17, 18, and 20 of said patent.

[*Official Gazette March 8, 1983.*]